Patented July 1, 1947

2,423,318

UNITED STATES PATENT OFFICE

2,423,318

VINYL CYANIDE FROM ACETYLENE AND HCN

Benjamin Wilson Howk, Wilmington, Del., assignor to E. I. du Pont de Nemours & Company, Wilmington, Del., a corporation of Delaware No Drawing. Application May 30, 1945,
Serial No. 596,807

6 Claims. (Cl. 260—464)

The present invention relates to the synthesis of acrylonitrile (vinyl cyanide) from hydrogen cyanide and acetylene and more particularly to a liquid phase process for the synthesis.

The preparation of vinyl cyanide in a liquid phase process employing catalysts containing cuprous salts and mineral acids has been described previously.

The cuprous chloride has been brought into solution with the aid of ammonium chloride, an alkali metal chloride such as potassium chloride, or an amine hydrochloride such as ethanolamine hydrochloride. The desired acidity has been obtained by the employment of strong mineral acids such as hydrochloric, hydrobromic, sulfuric or phosphoric acid.

The catalysts hitherto employed have serious disadvantages. They produce substantial amounts of by-products chief among which are acetaldehyde, paraldehyde, monovinylacetylene, and other polymers of acetylene. As a result the yield of vinyl cyanide based on acetylene is not entirely satisfactory, the purification of the vinyl cyanide presents a serious problem, and, finally, the formation of the chemically unstable polymers of acetylene in considerable amounts constitutes a hazard well recognized by those skilled in this particular phase of the art. Moreover the catalysts described previously are not pH-stable, by which is meant that they gradually become less acid with use and it is necessary to maintain a pH corresponding to high catalyst activity by the judicious addition of mineral acid from time to time. This latter procedure requires close control and involves considerable analytical work.

This invention has as an object a process whereby acetylene is converted to vinyl cyanide in good yield with a minimum formation of by-products. A further object is a process employing a catalyst which is readily prepared and maintains its optimum acidity for a long period of time. A further object is a process of decreased hazard. Another object is a process less demanding of constant attention and control. Other objects will appear hereinafter.

These objects are accomplished by the following invention wherein acetylene is reacted with hydrogen cyanide in contact with an aqueous solution of a cuprous chloride complex rendered acid to a pH not exceeding 4 by means of a water soluble aliphatic polycarboxylic acid, at a space velocity of 0.020 to 0.030 parts by weight of hydrogen cyanide per part of cuprous chloride per hour, and at an acetylene/hydrogen cyanide ratio of from 5:1 to 7:1 at a temperature of 80–90° C.

In the practice of this invention a mixture of hydrogen cyanide and acetylene in the desired proportions is led into a well agitated, acidic solution containing a cuprous salt such as cuprous chloride. Since a high content of soluble cuprous compound is desirable and since cuprous chloride itself is relatively insoluble, it is desirable also to incorporate in the catalyst any of certain materials which form soluble cuprous complexes and among these ammonium chloride, ethanolamine hydrochloride, and potassium chloride may be mentioned. With the specific objects of minimizing the formation of by-products and producing a catalyst having a stable pH, the catalyst is acidified not with a mineral acid, but with a relatively nonvolatile aliphatic polycarboxylic acid of only moderate strength, e. g., succinic acid. A little metallic copper may be added to reduce the cupric salt ordinarily present in cuprous chloride and maintain the soluble copper in the cuprous condition. The reactants should be essentially oxygen-free since the catalyst is readily susceptible to oxidation. A catalyst temperature of 80–90° C. is preferred. The hydrogen cyanide velocity should be approximately one part by weight of hydrogen cyanide for 40–50 parts of cuprous chloride per hour and this condition is important since, at higher velocities, the conversion of hydrogen cyanide is incomplete, a part appearing in the reaction product and a part being retained in the catalyst and causing deterioration in its activity. At lower hydrogen cyanide velocities, the space-time yield of vinyl cyanide decreases and the proportion of monovinylacetylene and other products derived from acetylene rises. An excess of acetylene is necessary to insure complete utilization of the hydrogen cyanide, but too great an excess again leads to extensive formation of by-products derived from acetylene. The recommended molar ratio is about 6:1.

The warm gases issuing from the catalyst chamber contain vinyl cyanide and unreacted acetylene. Refrigeration of the gases to $-15°$ C., or even as low as $-50°$ C., gives a condensate which consists essentially of vinyl cyanide and water. The uncondensed gas, chiefly acetylene, may be recycled.

The following illustrative, but not limitative example, in which all parts are by weight, illustrates the invention.

A catalyst was prepared by mixing, to a pH of approximately 2, in an atmosphere of nitrogen, 376 parts of cuprous chloride, 125 parts of ammonium chloride, 25 parts of succinic acid, 300 parts of water, and 30 parts of powdered copper metal. The catalyst was then heated to 90° C. with vigorous agitation and a gaseous mixture consisting of 8.0 parts of hydrogen cyanide and 46.2 parts of acetylene per hour was delivered to the bottom of the catalyst chamber. The gaseous products passed upward through a vertical condenser which maintained, from bottom to top, a temperature gradient of about 0° to −60° C. The condensate dropped into a separator from which the lower aqueous layer was returned to the catalyst and the upper layer, crude vinyl cyanide, was drawn off. The uncondensed acetylene could be recycled. A period of about 30–60 minutes was required for the catalyst to reach equilibrium after which there was produced, per hour, approximately 20 parts of crude vinyl cyanide which on distillation yielded the following:

| Product | Boiling range, °C. | Parts by weight |
|---|---|---|
| Monovinylacetylene | To 20 | 0.0 |
| Hydrogen cyanide | | |
| acetaldehyde | 20–30 | 0.3 |
| | | 3.1 |
| Vinyl cyanide (as water binary) | 65–75 | 14.8 |

The off-gas, which contained a small amount of monovinylacetylene in addition to acetylene, was analyzed for monovinylacetylene by measuring the intensity of its infrared absorption at 10.75 microns and comparing the figure with those obtained by similar measurements on gas mixtures containing acetylene and monovinylacetylene in known proportions. By this procedure the off-gas was found to contain 0.6 volume per cent of monovinylacetylene.

The wet vinyl cyanide was analyzed for vinyl cyanide as follows. A sample of exactly one cc. was added to a mixture of 50 cc. of 0.326 N sodium thioglycolate and three cc. of triethylamine and the mixture allowed to stand for one-half hour, after which it was acidified with hydrochloric acid. Starch solution was added and the remaining thioglycolic acid determined by titration with standard iodine solution. The vinyl cyanide was thus shown to have consumed .0147 gram equivalents of thioglycolic acid or 98% of that consumed under similar conditions by pure vinyl cyanide saturated with water. Since the analytical method is specific for vinyl cyanide the analysis indicated that the vinyl cyanide-water binary contained no more than 2% of foreign materials.

For comparison a catalyst of the prior art type was prepared by mixing 376 parts of cuprous chloride, 125 parts of ammonium chloride, 300 parts of water, and 30 parts of powdered copper metal in an atmosphere of nitrogen. The catalyst was then heated to 90° C. with good agitation and acidified with concentrated hydrochloric acid to a pH of 2.0 with the aid of a pH meter. The pH could also be determined by means of a suitable indicator paper. The catalyst was then heated and stirred for an additional hour with further additions of small amounts of acid to maintain the desired acidity. A total of about 20 parts of concentrated acid was required, the amount depending on the purity of the cuprous chloride. The reaction was then conducted exactly as above, the product from the first 60 minutes of operation being discarded, after which there was produced, per hour, approximately parts of crude vinyl cyanide which, on distillation yielded the following:

| Product | Boiling range, °C. | Parts by weight |
|---|---|---|
| Monovinylacetylene | To 20 | 0.7 |
| Hydrogen cyanide | | |
| acetaldehyde | 20–30 | 0.2 |
| | | 2.0 |
| Vinyl cyanide (as water binary) | 65–75 | 14.9 |

The off-gas, analyzed as above, contained 1.2 vol. per cent of monovinylacetylene, or about twice the percentage indicated in the above exemplification of the present invention. The wet vinyl cyanide contained 0.0143 gram equivalents of vinyl cyanide per cc. or about 93% of the theoretical. The chief impurity was paraldehyde, which could be isolated by drying and fractionally distilling the vinyl cyanide fractions yielding pure vinyl cyanide and paraldehyde, B. P. 120–125° C.

The novel feature of the present invention consists in the employment of a catalyst which is acidic by virtue of its content of an aliphatic polycarboxylic acid. Succinic acid, glutaric acid, adipic acid, sebacic acid, and tricarballylic acid may be mentioned as representative aliphatic polycarboxylic acids suitable for use in the process of this invention. The acids suitable are water soluble and, in comparison with the strong mineral acids, are relatively weak acids. They have less of a tendency to promote side reactions.

The process of this invention is carried out at 80–90° C. At temperatures outside this range the rate of conversion to vinyl cyanide is appreciably lower. The hydrogen cyanide velocity is from 0.020 to 0.030 part by weight per part of cuprous chloride per hour and the ratio of acetylene to hydrogen cyanide is 5:1 to 7:1.

The present invention accomplishes a substantially complete conversion of the hydrogen cyanide to vinyl cyanide with a minimum formation of by-products, with the aid of a catalyst which is easily prepared and which maintains its optimum acidity for a long period of time.

The invention is described above in a specific embodiment but is not to be limited thereto but is to be construed broadly and restricted solely by the scope of the following claims.

What is claimed is:

1. In the process for the preparation of vinyl cyanide by the reaction of hydrogen cyanide with acetylene in the presence of an aqueous solution of a cuprous chloride complex, the improvement whereby the acidity of the catalyst solution is maintained at a pH not exceeding 4 by means of a water-soluble aliphatic polycarboxylic acid.

2. In the process for the preparation of vinyl cyanide by the reaction of hydrogen cyanide with acetylene in the presence of an aqueous solution of a cuprous chloride complex, the improvement whereby the acidity of the catalyst solution is maintained at a pH not exceeding 4 by means of succinic acid.

3. A process for the preparation of vinyl cyanide which comprises reacting acetylene with hydrogen cyanide in the presence of an aqueous solution of a cuprous chloride catalyst acidified to a pH not exceeding 4 by means of a water-soluble aliphatic polycarboxylic acid.

4. A process for the preparation of vinyl cyanide which comprises reacting acetylene with hydrogen cyanide in the presence of an aqueous solution of a cuprous chloride catalyst acidified to a pH not exceeding 4 by means of succinic acid.

5. A process for the preparation of vinyl cyanide which comprises reacting acetylene with hydrogen cyanide in the presence of an aqueous solution of a cuprous chloride catalyst acidified to a pH not exceeding 4 by means of a water-soluble aliphatic polycarboxylic acid at a hydrogen cyanide velocity of from 0.02 to 0.03 part by weight per part by weight of cuprous chloride per hour, an acetylene/hydrogen cyanide ratio of from 5:1 to 7:1 and a temperature of 80–90° C.

6. A process for the preparation of vinyl cyanide which comprises reacting acetylene with hydrogen cyanide in the presence of an aqueous solution of a cuprous chloride catalyst acidified to a pH not exceeding 4 by means of succinic acid at a hydrogen cyanide velocity of from 0.02 to 0.03 part by weight per part by weight of cuprous chloride per hour, an acetylene/hydrogen cyanide ratio of from 5:1 to 7:1 and a temperature of 80–90° C.

BENJAMIN WILSON HOWK.

REFERENCES CITED

The following references are of record in the file of this patent:

UNITED STATES PATENTS

| Number | Name | Date |
| --- | --- | --- |
| 2,322,696 | Kurtz et al. | June 22, 1943 |
| 2,385,327 | Bradley et al. | Sept. 25, 1945 |
| 2,385,469 | Salley | Sept. 25, 1945 |
| 2,385,470 | Salley et al. | Sept. 25, 1945 |

FOREIGN PATENTS

| Number | Country | Date |
| --- | --- | --- |
| 217,478 | Switzerland | Feb. 2, 1942 |